(12) United States Patent
Gunderson et al.

(10) Patent No.: US 7,070,641 B1
(45) Date of Patent: Jul. 4, 2006

(54) CARBON MEDIA FILTER ELEMENT

(75) Inventors: Larry T. Gunderson, Madison, WI (US); Eric Schroeder, Neenah, WI (US); Mark C. Schroeder, Oregon, WI (US); Thomas A. Fosdal, Stoughton, WI (US); Eric A. Janikowski, Jefferson, WI (US)

(73) Assignee: Fleetguard, Inc., Nashville, TN (US)

( * ) Notice: Subject to any disclaimer, the term of this patent is extended or adjusted under 35 U.S.C. 154(b) by 180 days.

(21) Appl. No.: 10/726,974

(22) Filed: Dec. 3, 2003

(51) Int. Cl.
*B01D 53/04* (2006.01)

(52) U.S. Cl. ............... 55/497; 55/502; 55/DIG. 5; 55/DIG. 31; 96/135; 96/154

(58) Field of Classification Search ............... 55/385.3, 55/497, 499, 502, 518, 521, DIG. 5, DIG. 13, 55/DIG. 31; 96/134, 135, 153, 154; 123/518, 123/519
See application file for complete search history.

(56) References Cited

U.S. PATENT DOCUMENTS

| | | | |
|---|---|---|---|
| 2,135,863 A | | 11/1938 | Walker |
| 3,183,286 A | * | 5/1965 | Harms .................. 264/46.4 |
| 3,368,326 A | * | 2/1968 | Hervert .................. 96/109 |
| 3,389,031 A | * | 6/1968 | Rosaen et al. ............ 156/74 |
| 3,456,635 A | * | 7/1969 | Hervert .................. 123/519 |
| 3,477,210 A | * | 11/1969 | Hervert .................. 96/144 |
| 3,540,423 A | * | 11/1970 | Tolles .................... 123/519 |
| 3,541,765 A | * | 11/1970 | Adler et al. ............. 96/138 |
| 3,572,013 A | * | 3/1971 | Hansen .................. 96/138 |
| 3,572,014 A | * | 3/1971 | Hansen .................. 96/138 |
| 3,665,906 A | * | 5/1972 | De Palma .............. 123/519 |
| 3,727,597 A | * | 4/1973 | Hensler .................. 123/519 |
| 3,747,303 A | * | 7/1973 | Jordan .................... 96/135 |
| 4,261,717 A | * | 4/1981 | Belore et al. ............ 96/112 |
| 4,279,630 A | * | 7/1981 | Nakamura et al. ........ 96/138 |
| 4,418,662 A | | 12/1983 | Engler et al. |
| 4,617,122 A | | 10/1986 | Kruse et al. |
| 5,129,929 A | * | 7/1992 | Linnersten ............. 96/117.5 |
| 5,354,365 A | * | 10/1994 | Youn ...................... 96/135 |
| 5,512,172 A | | 4/1996 | Marble |
| 5,531,892 A | | 7/1996 | Duffy |
| 5,620,505 A | * | 4/1997 | Koch et al. .............. 96/134 |
| 5,679,122 A | * | 10/1997 | Moll et al. .............. 55/497 |
| 6,074,450 A | | 6/2000 | Raber |
| 6,156,089 A | * | 12/2000 | Stemmer et al. .......... 55/467 |
| 6,200,368 B1 | * | 3/2001 | Guerin et al. ............ 96/135 |
| 6,228,152 B1 | * | 5/2001 | Guerin et al. ............ 96/135 |
| 6,319,300 B1 | | 11/2001 | Chen |
| 6,348,086 B1 | * | 2/2002 | Harms et al. ............ 96/125 |
| 6,352,579 B1 | * | 3/2002 | Hirata et al. ............ 96/134 |
| 6,375,669 B1 | | 4/2002 | Rosenbluth et al. |
| 6,379,437 B1 | * | 4/2002 | Heinonen et al. ......... 96/135 |
| 6,379,438 B1 | * | 4/2002 | Schneider et al. ........ 96/154 |
| 6,438,486 B1 | * | 8/2002 | Mancini ................. 701/104 |

(Continued)

FOREIGN PATENT DOCUMENTS

EP       0399730 A1  *  11/1990

(Continued)

Primary Examiner—Frank M. Lawrence
(74) Attorney, Agent, or Firm—Andrus, Sceales, Starke & Sawall, LLP

(57) ABSTRACT

A carbon media filter element with urethane frame and seal has a border member composed of urethane providing a combined structural frame and seal extending along the perimeter and providing both the support frame for the media and a seal along the ends of the media sheet retaining carbon granules between backing layers and preventing escape of carbon granules out of the end. Manufacturing apparatus and methods are provided.

6 Claims, 3 Drawing Sheets

U.S. PATENT DOCUMENTS

| | | | |
|---|---|---|---|
| 6,521,011 B1 * | 2/2003 | Sundet et al. | 55/499 |
| 6,692,555 B1 * | 2/2004 | Oda et al. | 96/134 |
| 2001/0003991 A1 * | 6/2001 | Sato et al. | 137/550 |
| 2001/0032545 A1 * | 10/2001 | Goto et al. | 96/134 |
| 2001/0035094 A1 * | 11/2001 | Takagaki et al. | 96/154 |
| 2002/0029693 A1 * | 3/2002 | Sakakibara et al. | 96/134 |
| 2003/0089092 A1 * | 5/2003 | Bause et al. | 55/524 |
| 2003/0196420 A1 * | 10/2003 | Chen | 55/497 |
| 2004/0163540 A1 * | 8/2004 | Mori et al. | 96/134 |
| 2005/0022490 A1 * | 2/2005 | Huang et al. | 55/486 |
| 2005/0081717 A1 * | 4/2005 | Meiller et al. | 96/154 |

FOREIGN PATENT DOCUMENTS

| | | | |
|---|---|---|---|
| JP | 54-98416 A | * | 8/1979 |
| JP | 56-20753 A | * | 2/1981 |
| JP | 56-32072 A | * | 4/1981 |
| JP | 56-44445 A | * | 4/1981 |
| JP | 63-205116 A | * | 8/1988 |
| JP | 63-287521 A | * | 11/1988 |
| JP | 4-161213 A | * | 6/1992 |
| JP | 4-200710 A | * | 7/1992 |
| JP | 5-245325 A | * | 9/1993 |

* cited by examiner

CARBON MEDIA FILTER ELEMENT

BACKGROUND AND SUMMARY OF THE INVENTION

The invention relates to carbon media filter elements, including for meeting automotive evaporative emission requirements in induction systems.

Automotive manufacturers must meet ever decreasing evaporative emissions specifications for induction systems. It is known to incorporate a carbon media filter element in the engine intake system to meet the noted regulations. The carbon filter media is provided by a granular carbon layer sandwiched between first and second outer backing layers and formed in a pleated configuration. The ends of the pleats must be completely sealed to prevent escape of carbon granules out of such ends. Prior sealing techniques, such as hotmelt techniques, vibration welding, etc., have been found deficient in not providing sufficient structural integrity.

The present invention provides an improved sealing and support system.

DETAILED DESCRIPTION

Figure 1:
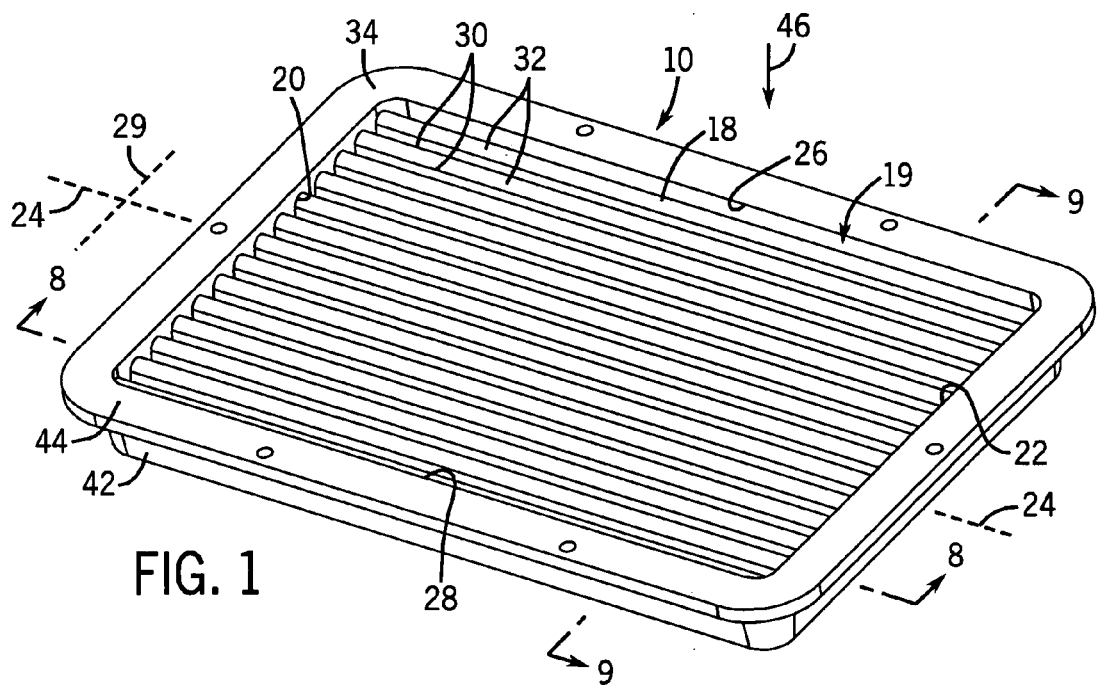
FIG. 1 is a perspective view of a carbon media filter element in accordance with the invention.
Figure 2:
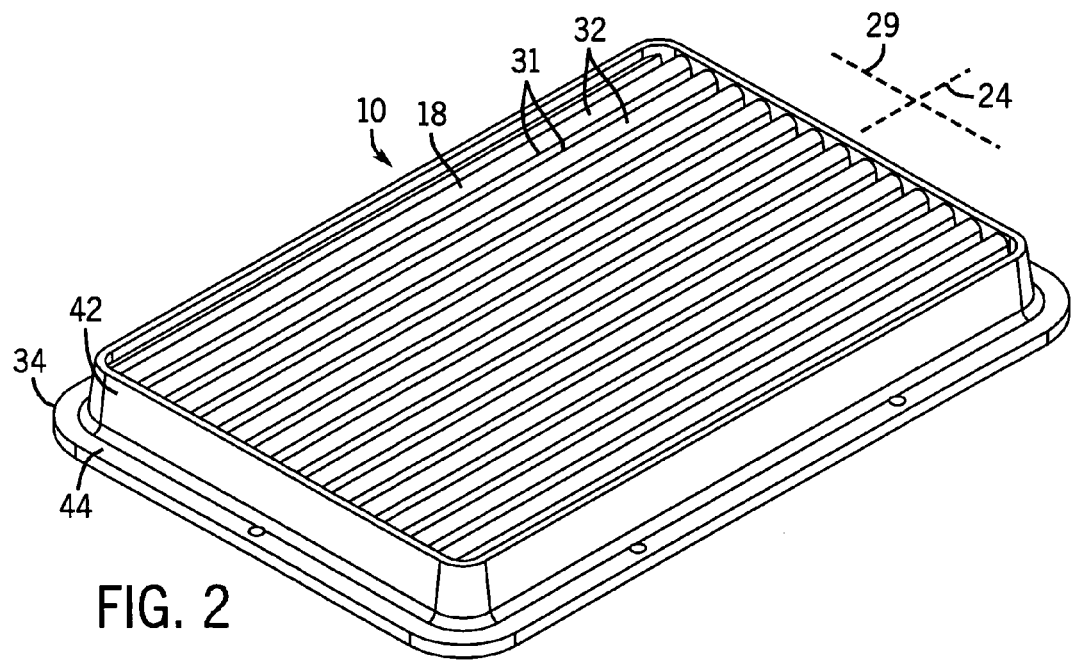
FIG. 2 is a perspective view from below of the element of FIG. 1.
Figure 3:
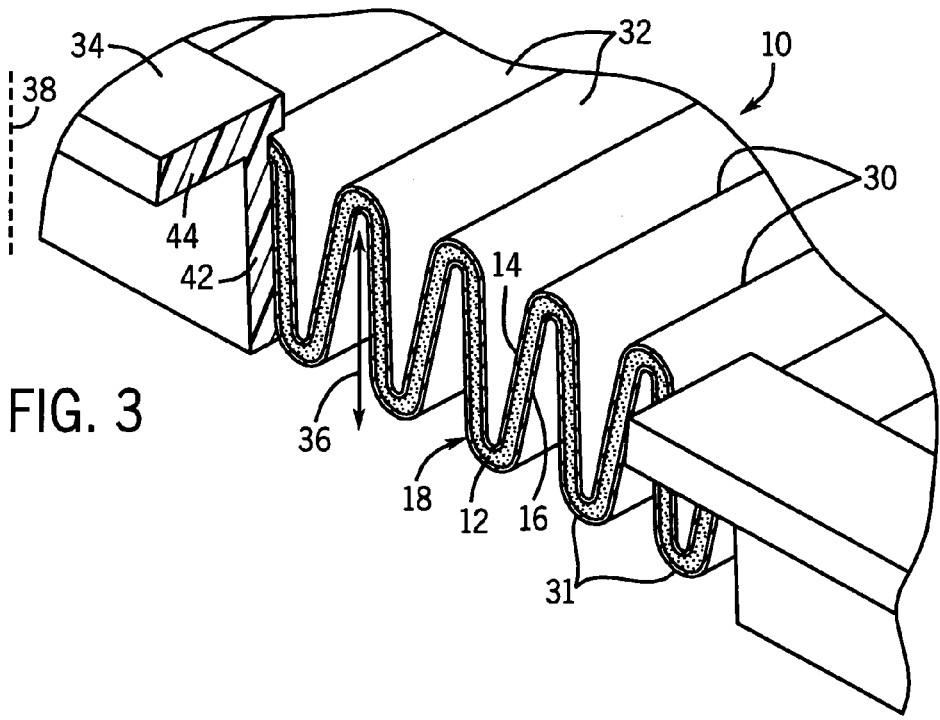
FIG. 3 is an enlarged perspective view of a portion of FIG. 1, partially cut away.

FIGS. 1–3 show a carbon media filter element 10 comprising a granular carbon layer 12, FIG. 3, sandwiched between first and second backing layers 14 and 16, and forming a sheet 18. The sheet has a perimeter 19 with first and second axial ends 20 and 22, FIG. 1, distally oppositely axially spaced along an axis 24, and first and second lateral ends 26 and 28 distally oppositely laterally spaced along lateral direction 29 relative to axis 24 and extending between axial ends 20 and 22. Sheet 18 is pleated along axially extending bend lines 30, 31 to provide a plurality of pleats 32 extending axially between axial ends 20 and 22. A border member 34 is composed of urethane and provides a combined structural frame and seal extending along perimeter 19 along ends 20, 26, 22, 28, and provides both the support frame for the carbon filter media and a seal along the ends of sheet 18 retaining carbon granules between backing layers 14 and 16 and preventing escape of carbon granules out of the ends.

Figure 9:
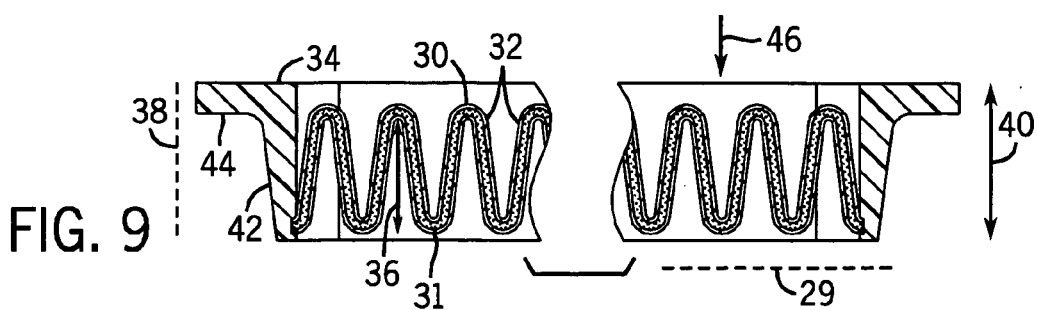
FIG. 9 is a sectional view taken along line 9—9 of FIG. 1.

Pleats 32 have a pleat height 36, FIGS. 3, 9, extending between bend lines 30 and 31 along a height direction 38 normal to axial direction 24 and normal to lateral direction 29. Border member 34 has a height 40, FIG. 9, extending along height direction 38 and at least as great as the height 36 of pleats 32 and covering and encapsulating axial ends 20 and 22 including carbon layer 12 and backing layers 14 and 16. The height 40 of border member 34 is uniform along the entire perimeter 19 of sheet 18 including at axial ends 20 and 22 and at lateral ends 26 and 28.

Border member 34 has a first section 42, FIGS. 1–3, 8, 9, extending along height direction 38 and providing the noted support frame and the noted seal. Border member 34 has a second section 44 extending laterally outwardly from section 42 and resiliently compressible along height direction 38 for gasket sealing, e.g. within an intake duct or the like. Both of sections 42 and 44 are composed of urethane. The noted gasket sealing of section 44 along height direction 38 is parallel to the flow direction 46 through the filter element. In one preferred embodiment, border member 34 has an L-shape provided by a first leg 42 extending along height direction 38, and a second leg 44 extending laterally outwardly from the first leg.

Figure 4:
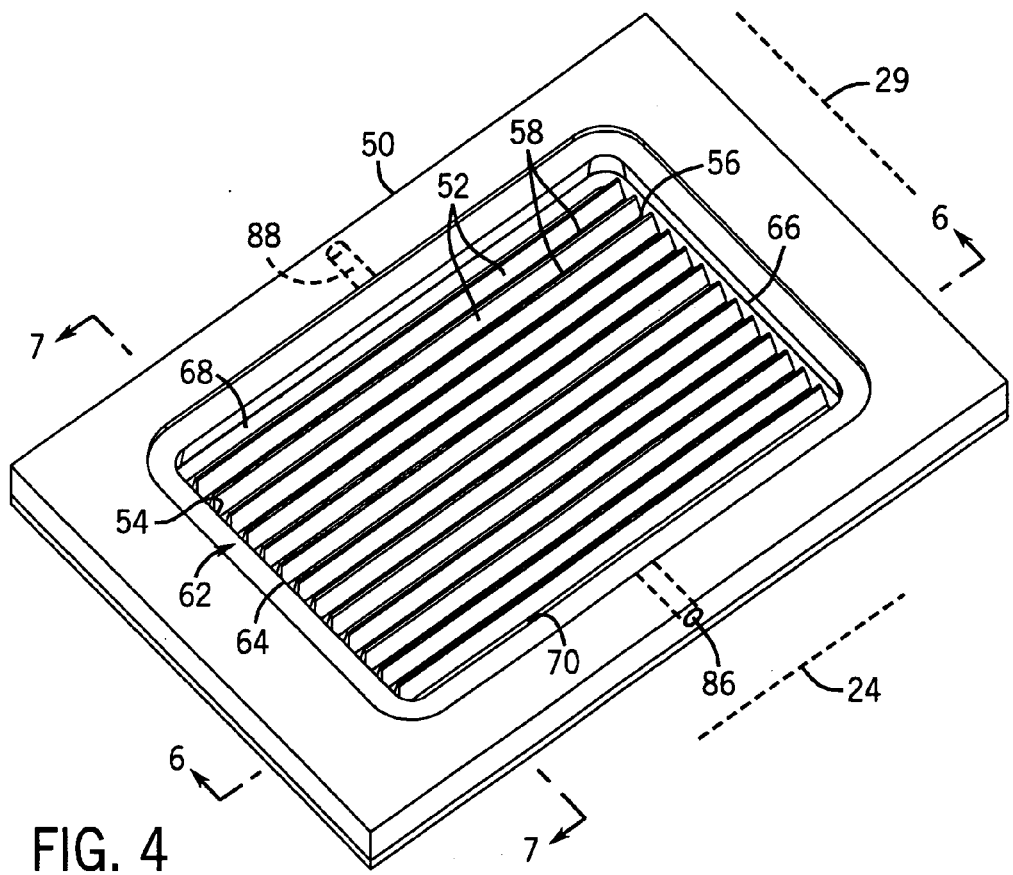
FIG. 4 is a perspective view of a mold base for making the element of FIG. 1.
Figure 6:
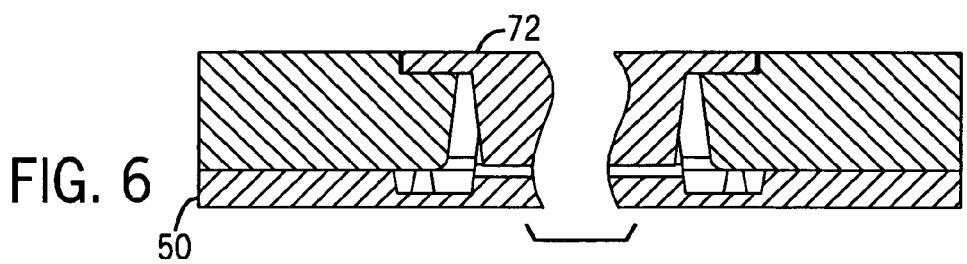
FIG. 6 is a sectional view taken along line 6—6 of FIG. 4.
Figure 7:
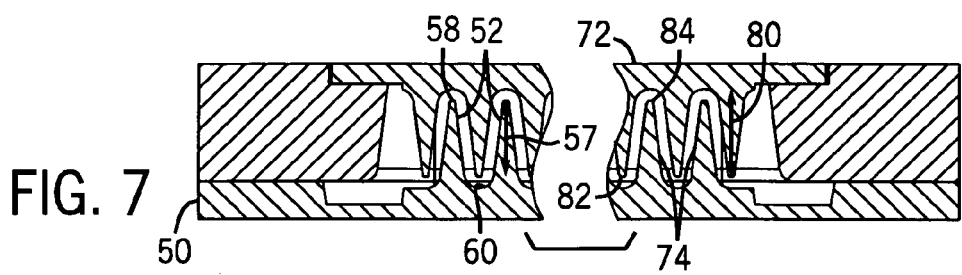
FIG. 7 is a sectional view taken along line 7—7 of FIG. 4.
Figure 8:
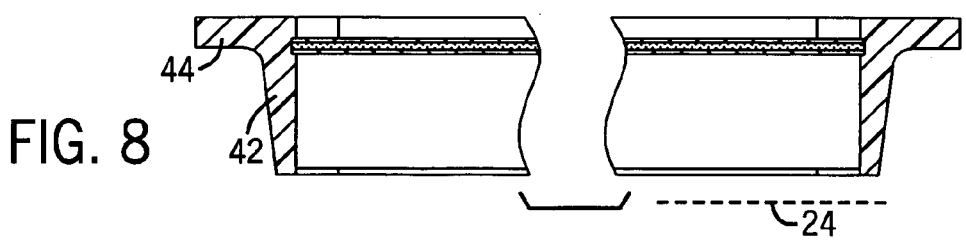
FIG. 8 is a sectional view taken along line 8—8 of FIG. 1.

Manufacturing apparatus for making carbon media filter element 10 includes a mold base 50, FIGS. 4, 6, 7, having a plurality of fins 52 extending axially between first and second axial ends 54 and 56, and having a height 57 extending upwardly along height direction 38 to upper peaks 58 defining axially extending bend lines 30 of sheet 18. Upper peaks 58 are laterally spaced by lower valleys 60 therebetween defining axially extending bend lines 31 of sheet 18. Base 50 has an inner perimeter 62 around fins 52. Inner perimeter 62 has first and second axial ends 64 and 66 distally oppositely axially spaced along axis 24, and has first and second lateral ends 68 and 70 distally oppositely laterally spaced along lateral direction 29 relative to axis 24. Lateral ends 68 and 70 of inner perimeter 62 extend axially between axial ends 64 and 66 of inner perimeter 62. Inner perimeter 62 provides a trough holding urethane therein.

Figure 5:
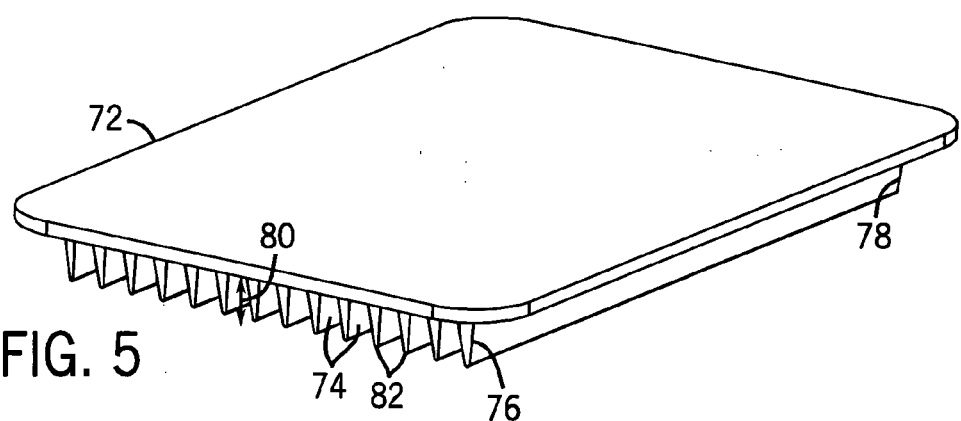
FIG. 5 is a perspective view of a mold top for making the element of FIG. 1.

A mold top 72, FIGS. 5–7, has a plurality of fins 74 extending axially between first and second axial ends 76 and 78, and having a height 80 extending downwardly along height direction 38 to lower peaks 82 defining axially extending bend lines 31 of sheet 18. Lower peaks 82 are laterally spaced by upper valleys 84 therebetween defining axially extending bend lines 30 of sheet 18. Mold top 72 mates with mold base 50 with sheet 18 therebetween being pleated by respective fins 74 and 52 and with urethane in inner perimeter trough 62 along ends 64, 70, 66, 68 molding to the ends 22, 26, 20, 28 of sheet 18 along perimeter 19 to provide the noted combined structural frame and seal border member. In one embodiment, one of the mold base and mold top has one or more injection ports therethrough communicating with trough 62 for injecting urethane thereinto, for example injection ports 86 and 88 in mold base 50. In one embodiment, sheet 18 is pleated between the fins of the mold base and the fins of the mold top prior to introduction of urethane into trough 62. Sheet 18 may be pre-pleated prior to being placed in mold base 50 or in mold top 72. As the urethane cures, it molds to the noted ends 22, 26, 20, 28 of sheet 18 along perimeter 19 to provide the noted combined structural frame and seal border member.

If desired, the ends of the sheet can be sealed by conventional techniques, e.g. hotmelt techniques, vibration welding, etc., prior to placing the sheet in mold base 50, to provide yet further sealing in combination with the noted urethane seal.

It is recognized that various equivalents, alternatives and modifications are possible within the scope of the appended claims.

What is claimed is:

1. A carbon media filter element with urethane frame and seal comprising carbon filter media comprising a granular carbon layer, including carbon granules, sandwiched between first and second backing layers and forming a sheet having a perimeter with first and second axial ends distally oppositely axially spaced along an axis along an axial direction, and first and second lateral ends distally oppositely laterally spaced relative to said axis along a lateral direction and extending axially between said first and second axial ends, said sheet being pleated alone axially extending bend lines to provide a plurality of pleats extending axially between said first and second axial ends, a border member composed of urethane and comprising a combined structural frame and seal extending along said perimeter and providing both a support frame for said media and a seal along said ends of said sheet retaining said carbon granules between said first and second backing layers and preventing escape of said carbon granules out of said ends, wherein said pleats have a pleat height extending between said bend lines along a height direction normal to said axial direction and normal to said lateral direction, and wherein said border member has a height extending along said height direction and at least as great as the height of said pleats and covering and encapsulating said first and second axial ends including said carbon layer and said first and second backing layers, said border member has a first section extending along said height direction and providing said support frame and said seal, and has a second section extending laterally outwardly from said first section in L-shape cross-section along all four of said ends, namely said first and second axial ends and said first and second lateral ends, said second section being resiliently compressible along said height direction for gasket sealing, both of said first and second sections being composed of urethane, said L-shape having a first leg providing said first section and a second leg providing said second section.

2. Manufacturing apparatus for making a carbon media filter element with urethane frame and seal, said carbon media filter element comprising carbon filter media comprising a granular carbon layer, including carbon granules, sandwiched between first and second backing layers and forming a sheet having a perimeter with first and second axial ends distally oppositely axially spaced along an axis along an axial direction, and first and second lateral ends distally oppositely laterally spaced relative to said axis along a lateral direction and extending axially between said first and second axial ends, said sheet being pleated along axially extending bend lines to provide a plurality of pleats extending axially between said first and second axial ends, and a border member composed of urethane and comprising a combined structural frame and seal extending along said perimeter and providing both a support frame for said media and a seal along said ends of said sheet retaining said carbon granules between said first and second backing layers and preventing escape of said carbon granules out of said ends, said manufacturing apparatus comprising a mold base having a plurality of fins extending axially between first and second axial ends, and having a height extending upwardly along said height direction to upper peaks defining axially extending bend lines of said sheet, said upper peaks being laterally spaced by lower valleys therebetween also defining axially extending bend lines of said sheet, said base having an inner perimeter around said fins and having first and second axial ends distally oppositely axially spaced along said axis, and having first and second lateral ends distally oppositely laterally spaced relative to said axis and extending axially between said first and second axial ends of said inner perimeter, and having a plurality of corners joining said axial and lateral ends of said inner perimeter, said inner perimeter providing a trough holding urethane therein, and a mold top having a plurality of fins extending axially between first and second axial ends, and having a height extending downwardly along said height direction to lower peaks defining axially extending bend lines of said sheet, said lower peaks being laterally spaced by upper valleys therebetween also defining axially extending bend lines of said sheet, said mold top mating with said mold base with said sheet therebetween being pleated by respective said fins and with said urethane in said trough molding to said ends of said sheet to provide said combined structural frame and seal border member.

3. The manufacturing apparatus according to claim 2 wherein one of said mold base and said mold top has one or more injection ports therethrough extending transversely to said height direction and communicating with said trough for injecting said urethane thereinto.

4. A method for making a carbon media filter element with urethane frame and seal, said carbon media filter element comprising carbon filter media comprising a granular carbon layer, including carbon granules, sandwiched between first and second backing layers and forming a sheet having a perimeter with first and second axial ends distally oppositely axially spaced along an axis along an axial direction, and first and second lateral ends distally oppositely laterally spaced relative to said axis along a lateral direction and extending axially between said first and second axial ends, said sheet being pleated along axially extending bend lines to provide a plurality of pleats extending axially between said first and second axial ends, and a border member composed of urethane and comprising a combined structural frame and seal extending along said perimeter and providing both a support frame for said media and a seal along said ends of said sheet retaining said carbon granules between said first and second backing layers and preventing escape of said carbon granules out of said ends, said method comprising providing a mold base having a plurality of fins extending axially between first and second axial ends, and having a height extending upwardly along said height direction to upper peaks defining axially extending bend lines of said sheet, said upper peaks being laterally spaced by lower valleys therebetween also defining axially extending bend lines of said sheet, providing said base with an inner perimeter around said fins and having first and second axial ends distally oppositely axially spaced along said axis, and having first and second lateral ends distally oppositely laterally spaced relative to said axis and extending axially between said first and second axial ends of said inner perimeter, and having a plurality of corners joining said axial and lateral ends of said inner perimeter, said inner perimeter providing a trough, providing a mold top having a plurality of fins extending axially between first and second axial ends, and having a height extending downwardly along said height direction to lower peaks defining axially extending bend lines of said sheet, said lower peaks being laterally spaced by upper valleys therebetween also defining axially extending bend lines of said sheet, providing said sheet between said mold base and said mold top and mating said mold base and said mold top with said sheet therebetween to pleat said sheet by respective said fins, and providing urethane in said trough and molding said urethane to said ends of said sheet to provide said combined structural frame and seal border member.

5. The method according to claim 4 comprising pleating said sheet between said fins of said mold base and said fins of said mold top prior to introduction of urethane into said trough.

6. The method according to claim 4 comprising providing at least one injection port through at least one of said mold base and said mold top and extending transversely to said height direction, and injecting molten urethane into said trough to provide said combined structural frame and seal border member.

* * * * *